US006395383B1

(12) United States Patent
Maples

(10) Patent No.: US 6,395,383 B1
(45) Date of Patent: May 28, 2002

(54) CHEMICAL PROTECTIVE COVERING

(75) Inventor: Allen B. Maples, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/460,168

(22) Filed: Dec. 13, 1999

(51) Int. Cl.[7] .................................................. B32B 3/00
(52) U.S. Cl. ................................ 428/319.3; 428/306.6; 428/308.4; 428/316.6; 428/318.4; 428/543
(58) Field of Search ........................... 428/306.6, 308.4, 428/316.6, 318.4, 319.3, 543

(56) References Cited

U.S. PATENT DOCUMENTS

| | | | |
|---|---|---|---|
| 4,039,440 A | 8/1977 | Cadotte | |
| 4,510,193 A | 4/1985 | Blucher et al. | |
| 4,943,475 A | 7/1990 | Baker et al. | |
| 5,024,594 A | 6/1991 | Athayde et al. | |
| 5,391,426 A | 2/1995 | Wu | |
| 5,740,551 A | 4/1998 | Walker | 2/16 |
| 5,743,775 A | 4/1998 | Baurmeister | |
| 5,824,405 A | 10/1998 | White | |

FOREIGN PATENT DOCUMENTS

| | | |
|---|---|---|
| JP | 56-129007 | 8/1981 |
| JP | 62-039637 | 2/1987 |
| JP | 62-057607 | 3/1987 |
| WO | WO 93/17760 | 9/1993 |

OTHER PUBLICATIONS

International Search Report for PCT/US00/33519 (2 pages).

Article entitled "Transport Phenomena of Chitosan Membrane in Pervaporation of Water—Ethanol Mixture" published in Separation Science and Technology, 33(4), pp. 517–535, 1998.

*Primary Examiner*—Blaine Copenheaver
*Assistant Examiner*—Leanna Roche
(74) *Attorney, Agent, or Firm*—Carol A. Lewis White

(57) ABSTRACT

This invention provides a selectively permeable protective covering capable of transmitting high quantities of water vapor while also being capable of significantly restricting the passage of noxious or harmful chemicals even under conditions of high humidification. The material of this invention provides the basis for creating protective garments and accessories suitable for application in the broad range of conditions likely to be encountered in realistic use scenarios. In its broadest aspect, the protective and water vapor permeable covering of this invention comprises a sheet of a polyamine polymer wherein at least 10% of the polyamine polymer amines are amine-acid moieties wherein the acidic species of said amine-acid moieties have a $pK_a$ less than 6.4.

47 Claims, 6 Drawing Sheets

CHEMICAL PROTECTIVE COVERING

FIELD OF THE INVENTION

This invention relates to chemical protective coverings. More specifically, the invention relates to materials and articles that can be used to afford protection of persons or contents from noxious or harmful chemicals in the form of vapors, aerosols, or particulates. The chemical protective coverings provided in accordance with the invention are particularly suitable for applications such as articles of clothing, tents, sleeping bags, and the like.

BACKGROUND OF THE INVENTION

Chemical protective coverings are intended to prevent harmful levels of chemicals existing in an external environment from reaching the user or wearer or contents of said materials.

Chemical protective clothing is worn when the surrounding environment may present a potential hazard of exposing an individual to harmful or noxious chemicals. Historically the materials used in protective clothing have had to trade off protection for comfort. That is, those offering more protection were unacceptably uncomfortable, and those being of satisfactory comfort did not offer acceptable protection.

For example, one approach which is known in the art, is to interpose what is generally referred to as an "impermeable" material between the wearer and the hazardous environment. A suitable material of this type will exhibit low permeability to harmful chemicals and yet be pliable enough to be employed in a garment or other article of clothing application. An example of this approach would be a glove utilizing butyl rubber as the barrier to harmful chemicals.

Although such materials may provide adequate protection from harmful chemicals by significantly restricting the passage of such agents, these materials also characteristically prevent the passage of water vapor. A material that to a great extent prevents the transmission of water vapor is termed non-breathable.

When used as protective coverings for people, non-breathable materials retard the human body's process of heat dissipation normally achieved through the evaporation of perspiration. Without significant transmission of water vapor, or breathability, prolonged use-of-such materials can result in intolerable discomfort and even death of the wearer. The discomfort will initially result from high levels of moisture generated by the wearer building up within the protective covering, followed by the heat stresses imposed upon the wearer due to the lack of evaporative cooling. This can progress to heat stroke, and eventually death. Thus, these types of materials may offer satisfactory protection, but unsatisfactory comfort. This problematic characteristic of non-breathable protective covering materials makes them unsuitable for anything more than very short duration usage or limited areas of coverage.

Conversely, many covering materials that possess significant water vapor transmission rates, for instance many woven textiles or nonwoven polyolefin materials, will not provide desired levels of protection to harmful or noxious chemicals. That is, these types of materials may offer satisfactory comfort, but unsatisfactory protection.

Various efforts have been made to address in more favorable terms the trade-off between protection and comfort.

One such effort, well known in the art, involves the use of adsorptive materials which are interposed between the wearer and the contaminated environment such as described in U.S. Pat. No. 4,510,193 by Blucher, Blucher, and de Ruiter.

Adsorptive chemical protective systems work by adsorbing hazardous liquids and vapors into sorbants, thus inhibiting them from reaching that which the systems are intended to protect. One limiting characteristic of sorbants is that they possess a finite capacity to adsorb chemicals. A second limiting characteristic of sorbants is that they will indiscriminately adsorb chemical species for which protection is unnecessary, thus reducing the available capacity for adsorption of the chemicals to which they were intended to provide protection.

The finite capacity and indiscriminate adsorption characteristics of adsorptive systems limit their duration of use and storage life. Adsorptive systems will begin to adsorb various chemical vapor contaminants present in the atmosphere upon exposure, thus progressively reducing their available capacity over time. This limits their duration of use. This process can even occur when the adsorptive systems are kept within sealed packages over long spans of time. This limits the storage life of such materials.

Additionally, the finite capacity and indiscriminate adsorption characteristics necessitate the incorporation of relatively large quantities of sorptive elements within a chemical protective covering in order to achieve and sustain adequate levels of protection. This can result in thick and heavy barrier systems that can have high resistances to heat and moisture transfer and can impose undesirable physiological stresses on the wearer. Thus, adsorptive systems are also restricted by a trade-off between protection and comfort.

Furthermore, increased bulk and weight are also undesired characteristics for the packaging, storage, handling, and transportation of these materials.

A more preferred approach to creating chemical protective coverings that provide satisfactory comfort and protection relies on the use of selectively permeable materials. Materials that are selectively permeable exhibit a significant preferential permeability to specific chemical species. This approach can allow the creation of protective coverings that facilitate the transmission of desired chemical species while restricting the passage of undesired chemical species. Particularly for articles of chemical protective clothing, it would be desirable for a selectively permeable material to have preferential permeability towards water vapor relative to noxious or harmful vapors. That is, the permeability to water vapor is to be substantially greater than the permeability to noxious or harmful vapors. This can provide the basis for protective coverings that will be comfortable while at the same time being highly protective.

As the protective function of selectively permeable materials is not dependent upon sorption of chemicals, they are not bound by the limitations intrinsic to adsorptive systems. Unlike adsorptive systems, which rely upon a significant mass and thickness of appropriate materials to provide adequate and sustained protection, selectively permeable materials, free of these limitations, can be made extremely thin and lightweight. This facilitates the creation of much less bulky and lighter protective garments and accessories.

Regardless of the type of protective covering material employed, it is likely to be exposed in use to differing and frequently varying conditions of humidity and temperature. For example, a wearer of a protective article of clothing will generate varying amounts of heat and moisture internal to the protective covering depending upon the physiological stresses imposed upon the wearer. External to the protective covering, the conditions will vary due to natural motivations such as weather conditions, or human influenced conditions such as could be found within a vehicle or man-made structure. Thus, it is to be expected that a protective covering will be exposed to a wide range of conditions during its use, which must be considered in the design and application of any protective covering material.

These conditions can influence the performance of selectively permeable materials. Selectively permeable materials that possess the desirable quality of high water vapor transmission are generally hydrophilic polymers. As such, their moisture content will be influenced by the relative humidity of their surroundings. As the surrounding relative humidity of such a selectively permeable material changes, the moisture level within the selectively permeable material will also change. In general, it is observed that these materials are more permeable to many chemical vapors at high relative humidity, and conversely are less permeable to many chemical vapors at low relative humidity. Thus, when such materials are employed in chemical protective covering applications, it is important to consider the protective characteristics of these materials over the range of relative humidities which are to be expected during use. Particularly, it is important to consider the permeation of noxious or harmful chemicals under conditions of high humidification. High resistance to the permeation of chemical vapors at conditions of mild relative humidity may not be representative of performance at elevated conditions of relative humidity.

For the applications under consideration, it would be desirable to reduce the permeability to noxious or harmful chemical vapors, particularly at high relative humidity, without an undesirable reduction in the permeation of water vapor. Similarly, it would be desirable to increase the permeation of water vapor, without an undesirable increase in the permeability to noxious or harmful chemical vapors, particularly at high relative humidity.

Thus, to be most useful in protective coverings, selectively permeable materials must provide good breathability and must provide low permeability to hazardous chemicals, particularly at the difficult condition of high relative humidity. Additionally, it is desirable to improve the breathability of such materials without significantly diminishing their protective performance, and to improve their protective performance without significantly diminishing their breathability.

A number of selectively permeable materials have been investigated for general use in these applications. These include a variety of films using cellulose-based polymers such as described in U.S. Pat. No. 5,743,775 by Ulrich Baurmeister and assigned to Akzo Nobel NV as well as porous polyamide films as detailed in U.S. Pat. No. 5,824,405 by Lloyd Steven White and assigned to W.R. Grace & Co. It has also been taught that good breathability and good resistance to hazardous chemicals can be achieved under some conditions using a polyalkyleneimine protective material as described in U.S. Pat. No. 5,391,426 by Huey S. Wu. However, the chemical permeation characteristics of each of these materials are evaluated under relatively low relative humidities that do not represent the range of conditions that would be encountered in use. The performance of these materials will be limited by their compromise between protection and comfort, particularly at elevated relative humidity.

SUMMARY OF THE INVENTION

Surprisingly, as taught herein, it has been discovered that the performance of a selectively permeable chemical protective covering based upon a polyamine polymer can be considerably and unexpectedly enhanced by incorporating amine-acid moieties within the polyamine polymer. Unexpectedly, it has been discovered that the water vapor transmission rate may be made substantially better without a comparable trade-off in protective qualities, particularly at elevated relative humidity. Further, it has been discovered that the resistance to noxious or harmful chemicals, particularly at conditions of elevated relative humidity, may be made substantially better without a comparable trade-off in water vapor transmission. And most surprisingly, it has been discovered that the ideal can be achieved wherein both the water vapor transmission rate and the resistance to noxious or harmful chemicals even at elevated conditions of relative humidity may be improved simultaneously, resulting in selectively permeable materials capable of concurrently providing improved comfort with improved protection.

Accordingly, it is an object of this invention to provide lightweight and pliable selectively permeable materials that exhibit high degrees of breathability in conjunction with protection over a wide range of conditions. It is an object of the present invention to provide a selectively permeable protective covering capable of transmitting high quantities of water vapor while also being capable of adequately restricting the passage of noxious or harmful chemical vapors, even under conditions of high humidification. The chemical protective covering of this invention may be used for chemical protective articles of clothing that are comfortable because of their ability to allow the efficient evaporation of perspiration via transmission of water vapor and are suitable for application in a broad range of conditions likely to be encountered in realistic use scenarios.

In its broadest aspect, the chemical protective and water vapor permeable covering of this invention comprises a selectively permeable sheet of a polyamine polymer wherein at least 10% of the polyamine polymer amines are amine-acid moieties wherein the acidic species of said amine-acid moieties have a $pK_a$ less than 6.4. The materials are selected and adjusted via experimentation to achieve a chemical protective covering which has a water vapor transmission rate greater than 2,000 g/($m^{2*}$day) and a permeability to bis-2-chloroethyl sulfide of less than 0.02 cm/sec, preferably less than 0.002 cm/sec, and more preferably less than 0.0002 cm/sec.

In one embodiment, the polyamine polymer with amine-acid moieties is part of a selectively permeable composite sheet where the polyamine polymer forms a substantially continuous layer residing essentially on the surface of a water vapor permeable substrate which may be an open pore substrate, a closed pore substrate, or a void-free substrate.

In further embodiments of the invention, the polyamine polymer with amine-acid moieties is part of a selectively permeable composite sheet with an open pore substrate, where at least a portion of the polyamine polymer resides within the substrate.

In another embodiment of the invention, the chemical protective covering is comprised of two water vapor permeable open pore polytetrafluoroethylene substrates and a polyalkyleneimine-containing polyamine polymer with amine-acid moieties specifically involving $H_2SO_4$ and at least 25% of the polyamine polymer amines. These materials are made to form a selectively permeable composite sheet where the polyamine polymer forms a substantially continuous layer residing between the substrates, with at least a portion of the polyamine polymer residing within each substrate.

The invention is particularly useful as or within articles of clothing such as garments, gloves, footwear, and the like.

DETAILED DESCRIPTION OF THE INVENTION

Figure 1:
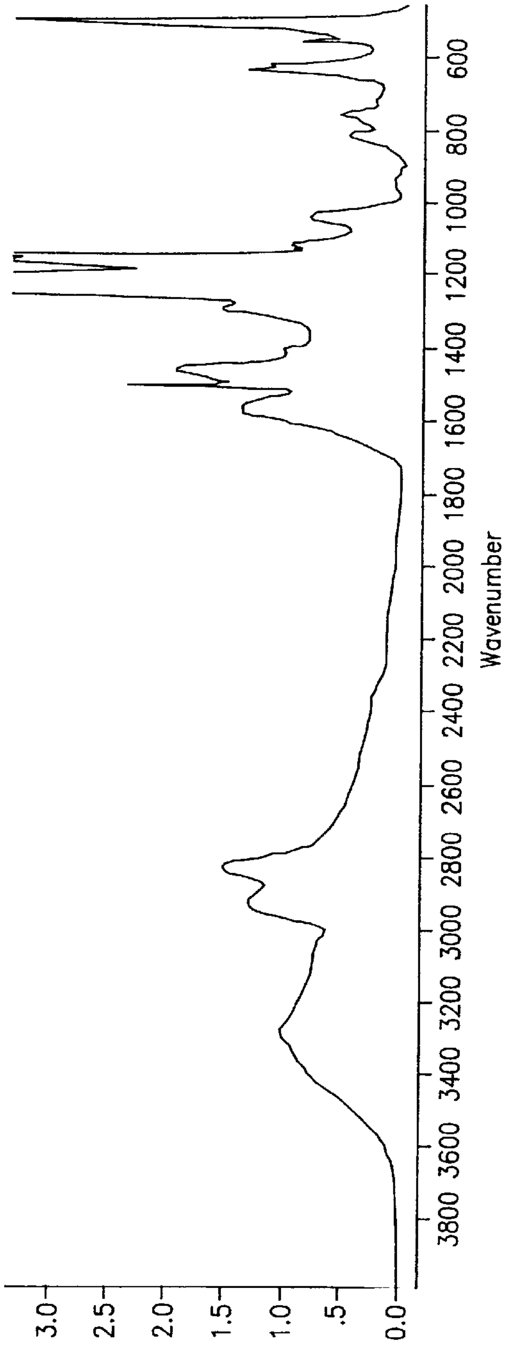
FIG. 1 shows an example of an infrared spectra of a polyamine polymer composite sheet with open pore expanded PTFE substrates.

The chemical protective covering of this invention includes an important feature: a polyamine polymer having at least 10% of its amines as amine-acid moieties where the acidic species involved have a $pK_a$ less than 6.4. This polyamine polymer may be formed into a selectively permeable sheet suitable for use in chemical protective coverings.

Embodiments of this invention additionally incorporate one or more water vapor permeable substrates that may provide support and protection for the polyamine polymer. These embodiments include the use of water vapor permeable substrates which are essentially void-free, as well as the use of porous substrates. The porous substrates include closed pore substrate materials, as well as open pore substrates, and this invention includes embodiments where at least a portion of the polyamine polymer may be made to at least partially fill the voids of such open pore substrates.

By chemical protective covering is meant a material or article that substantially restricts the passage of noxious or harmful chemicals, and is intended to be interposed between those harmful chemicals and that which it is meant to protect. The chemical protective covering of this invention is especially intended to protect people, animals, and plants. Such a material or article may be in the form of, for example, films, liners, laminates, blankets, tents, sleeping bags, sacks, footwear, gloves, garments, and the like.

The preferred chemical protective covering will be pliable. By pliable is meant supple enough to bend freely and without breaking. Pliable materials will be potentially suitable for use in applications such as chemical protective articles of clothing. More preferred pliable chemical protective coverings will have a hand, as indicated by a Handle-O-Meter measurement, of less than 1000, and will have no apparent damage such as fractures or significant breakage subsequent to evaluation. The most preferred pliable chemical protective coverings will have a hand of less than 250, and will have no apparent damage such as fractures or other significant breakage subsequent to evaluation.

By selectively permeable is meant possessing significantly differing permeabilities to desired chemical penetrants relative to undesired chemical penetrants. Permeability to the desired penetrants, e.g. water vapor, should be high compared to the permeability to undesired penetrants, e.g. noxious or harmful chemical vapors. Useful selectively permeable materials would have at least a 5 to 10 times greater permeability to water vapor versus the permeability to noxious or harmful chemical vapors. More useful are selectively permeable materials which have a 50 to 100 times difference, or even a 500 to 1000 times difference.

By polyamine polymer is meant a polymer having a plurality of amines. A significant portion of the amines within the polyamine polymer of this invention are in the form of amine-acid moieties.

By amine-acid moiety is meant the product which would result from a reaction between an amine group, which is basic, and an acid group. The amine-acid moieties could be the result of any number of chemical or physical processes such that the product is that which would occur when amine groups and acid groups are brought into association with one another. Such processes would include, but are not limited to, free acids added to a polyamine polymer (e.g., incorporation of sulfuric acid), or as a result or a byproduct of another reaction (e.g., the reaction of amines with chloroalkyl compounds resulting in alkylation of amines and HCl production), or by the covalent addition of acidic functionalities within the polyamine polymer (e.g., the reaction of acrylic acid through its vinyl group to the polyamine polymer).

By acidic species is meant a molecule or chemical compound with one or more acidic functionalities.

By substrate is meant a sheet-like material which is combined with the polyamine polymer by any of numerous coating and laminating techniques forming a selectively permeable composite sheet. The substrate will be water vapor permeable.

By water vapor permeable is meant having a water vapor transmission rate of at least 500 g/($m^{2*}$day).

By composite sheet is meant a substantially planar combination of two or more materials having layer to layer surface contact or impregnation, fully or partially, of one on and/or into another.

The substrate or substrates may provide protection and support to the polyamine polymer. The substrate or substrates may provide physical protection, such as from abrasion, tearing, or puncture, and may provide protection from chemicals, particularly liquids, which may harm or otherwise detrimentally affect the performance of the system. The substrate may be an open pore material, a closed pore material, or may be an essentially void free material.

By open pore is meant that a material has continuous, interconnected pores, voids, cavities, or channels at least partially through its thickness, which are open and accessible from at least one side of the material. This access is important in the case of open pore substrates, where it can be desirable to place at least a portion of the polyamine polymer at least partially within the substrate pores.

The open pore substrate can be any suitably porous material having such open and accessible pores, voids, cavities, or channels, such as, for example, a woven, nonwoven, or knit fabric, or a porous polymeric film. Suitable open pore polymeric films include, but are not limited to, open pore films of polyethylene, polysulfone, polypropylene, polyamides, polytetrafluoroethylene, polyetherimides, cellulosics, and the like. Preferably the open pore substrate is expanded polytetrafluoroethylene (PTFE) that is composed of nodes interconnected by fibrils which form the pores, as taught in U.S. Pat. No. 4,187,390 or U.S. Pat. No. 3,953,566.

Or the substrate can be an essentially closed pore material such as a closed cell foam or porous film with occlusive surfaces which, although having internal porosity, does not have significant openings or accessibility to the porosity from the exterior of the material. Preferred water vapor permeable closed pore materials will be composed of polyether polymers such as polyether polyesters or polyether polyurethanes.

Or the substrate can be an essentially void-free material, that is, a generally continuous, monolithic material lacking significant porosity. Preferred water vapor permeable substrates of this type will be such materials as sheets or films of cellulosics, polyether polyesters, and polyether polyurethanes.

Additionally, the substrate or substrates may have coatings which enhance the properties of the composite sheet. For example, the water vapor permeable substrates may have coatings which improve the bond between the polyamine polymer and substrate creating a stronger or more durable composite. Or, for example, the water vapor permeable substrates may have coatings which provides additional protection of the polyamine polymer from such materials as oils or other potential contaminants. Particularly, the open pore substrates may use coated membranes as described in U.S. Pat. No. 5,539,072.

The polyamine polymer will have at least 1.0 amine milliequivalents/g, preferably at least 2.5 amine milliequivalents/g, and more preferably at least 6.5 amine milliequivalents/g.

The amines of the polyamine polymer may be of a wide variety in so much that the amines are substantially basic, in general having a $pK_b$ less than 12, thus potentially reactive with acidic species. Thus, it is understood that nitrogen-containing chemical groups such as amides and imides would be excluded, as they are not substantially basic.

Such basic amines of the polyamine polymer of the invention may be, for example, primary, secondary, or tertiary amines, or any combination thereof, and may be connected to a variety of other groups such as aryl, alkyl, allyl, or alkene groups. The amines of the polyamine polymer may also be imines, that is, connected to a carbon atom via a double bond.

The polyamine polymer may be comprised of amines from a variety of materials and combinations of materials. Preferably, the amines of the polyamine polymer will be from polyalkylamines that contain repeat units in which the amine groups are directly connected to alkyl groups. The polyalkylamines may be selected from materials such as polyvinylamine, and more preferably may be selected from polyalkyleneimines such as polyethyleneimine and polypropyleneimine. Polyethyleneimine is the most preferred, and has the repeat unit structure $(—NR_1R_2—CH_2—CH_2—)_n$, often produced from the cyclic monomer ethyleneimine (aziridine). The number of repeat units, n, can be any positive integer, and $R_1$ and $R_2$ may each be either a hydrogen or the repeat unit described connected through the ethyl group.

The acidic species of the amine-acid moieties will be proton donating acidic species and will have a $pK_a$ of less than 6.4. It is well known that atmospheric carbon dioxide, in conjunction with moisture, will interact to form carbonic acid, which possesses a $pK_a$ of 6.4. Further, it is well known that carbonic acid, although relatively weak, will react with amines, and that this reaction is subject to transients and reversals driven by temperature and surrounding $CO_2$ and moisture concentrations. It is also known that stronger acids will in general displace weaker acids. For these reasons it is desired that acidic species of the amine-acid moieties of this invention possess a disassociation constant which is stronger than that of carbonic acid, thus a $pK_a$ of less than 6.4. More preferred are acidic species which possess a $pK_a$ of 5 or less, and most preferred are acidic species which possess a $pK_a$ of 2.5 or less.

For free acids which are incorporated as part of the polyamine polymer, such as by the addition of phosphoric acid to a polyamine polymer, the $pK_a$ are clearly understood. For example, phosphoric acid is an acidic species having a $pK_a$ of 2.1. Phosphoric acid, being a multiprotic acid, also has $pK_a$ of 7.2 and 12.7. For acidic species which cannot be separated from the polyamine polymer, for example acidic species which are covalently bound within the polyamine polymer, the acidic species is recognized to have a $pK_a$ which is typical for the acidic group of the species. For example, if a carboxylic acid were covalently bound within the polyamine polymer, it would be understood that the $pK_a$ of such a resulting acidic species would be typical of similar carboxylic acid groups, and thus would have a $pK_a$ between 3.0 and 5.0.

Preferably the acidic species of the polyamine polymer amine-acid moieties will be multiprotic acidic species. Multiprotic acidic species would include, for example, sulfuric, sulfurous, phosphoric, oxalic, malonic, maleic, citric, tartaric, and fumaric acid. The acidic species may also be monoprotic. Monoprotic acidic species would include, for example, hydrochloric, pyruvic, acetic, and formic acid. The acidic species may also be polymeric, such as polyacrylic acid. The acidic species may also be covalently bound within the polyamine polymer, such as would result from the reaction to the aldehyde of glyoxylic acid. A single type of acidic species may be used, or combinations of two or more types of acidic species may be used.

In a preferred embodiment, amine-acid moieties are created by incorporation of sulfuric acid into the polyamine polymer.

The amount and nature of the amine-acid moieties within the polyamine polymer can be best determined stoichiometrically. That is, the amines within the polyamine polymer and the acidic species within the polyamine polymer are ideally identified by knowledge of the constituents and composition of the polyamine polymer. Thus, the resulting types and quantities of amine-acid moieties are ideally determined through an understanding of the components and reactions used to form the polyamine polymer.

Alternatively, the polyamine polymer can be characterized by a number of analytical techniques, including, but not limited to, extraction, elemental analysis, titration, chromatography, mass spectroscopy, infrared spectroscopy, and inductively couple plasma (ICP) analysis.

Figure 2:
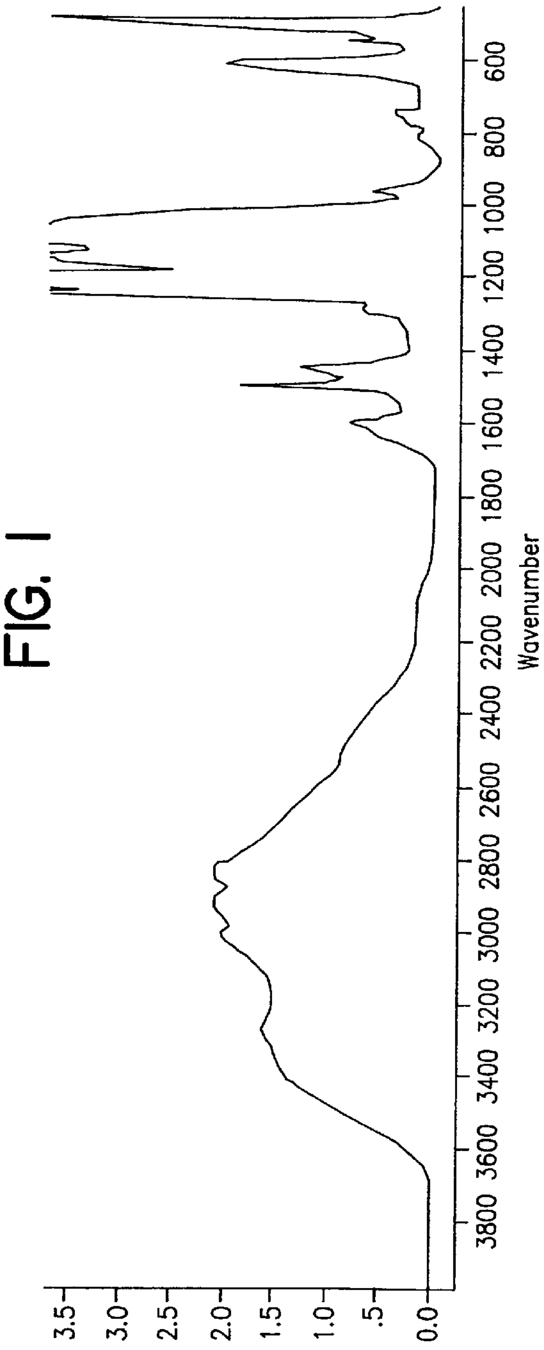
FIG. 2 shows an example of an infrared spectra of the same material from FIG. 1 after the incorporation of amine-acid moieties by the addition of sulfuric acid.

FIG. 1 shows an infrared spectra of a polyamine polymer composite sheet with open pore expanded PTFE substrates. FIG. 2 shows the same material after incorporation of amine-acid moieties by the addition of sulfuric acid, and is indicative of one embodiment of the invention.

In many instances it may be possible to extract acidic species from the polyamine polymer by contacting with a strongly basic solution, such as an aqueous 0.1 normal sodium hydroxide solution. The solution with extractant may then be analyzed by known techniques to determine the type and quantity of acidic species. These techniques may include, for example, ion chromatography and chemical elemental analysis.

In preferred materials, at least 25% of the amines within the polyamine polymer will be amine-acid moieties. Known titration methods may be used as an analytical technique for determining the percentage of amines within the polyamine polymer which would be amine-acid moieties. The equivalents of total amines may be determined by bringing the polyamine polymer into contact with and equilibrated within an aqueous solution at pH=11, and then titrating the solution containing the polyamine polymer to pH=3. The equivalents of amines which are not amine-acid moieties may be determined by equilibrating the material in pure water and then titrating to pH=3. The acid equivalents required indicate the equivalents of amines which would not be amine-acid moieties. The difference between the total amine equivalents and the amine equivalents which would not be amine-acid moieties may be considered the equivalents of amines which would be amine-acid moieties. The percentage of amines which would be amine-acid moieties may then be determined from the ratio of amine-acid equivalents to total amine equivalents. In more preferred materials, at least 40% of the polyamine polymer amines are amine-acid moieties.

The polyamine polymer will preferably be cross-linked. Cross-linking, creating insoluble polymer networks, can be achieved by any of various means known in the art. One route is to cross-link via the amine functionalities within the polyamine polymer. As such, suitable cross-linking agents may be selected from, for example, polyepoxides, polybasic esters, aldehydes, and alkylhalides. In a preferred embodiment, the polyamines are cross-linked at least in part by epoxide linkages.

The polyamine polymer will be made to form a selectively permeable sheet or layer, which, in some embodiments, may be part of a composite sheet with at least one water vapor permeable substrate. The selectively permeable sheet or layer will be substantially continuous and thus resistant to the bulk flow of air through its thickness, having a Gurley air resistance to air flow through the selectively permeable sheet of greater than 5 seconds.

In the composite sheets of polyamine polymer and substrates, the polyamine polymer will be coated on or within, partially or entirely, or otherwise directly attached to the water vapor permeable substrate. The polyamine polymer will preferably be formed to have a thickness between 1 and 1000 microns, more preferably between 5 and 100 microns. In general, the substrate will be about 0.005 mm to 2.0 mm thick, preferably between about 0.01 mm and 0.1 mm thick.

The preferred substrate will have a water vapor transmission rate of at least 4,000 $g/(m^{2*}day)$, more preferred substrates will have a water vapor transmission rate of at least 20,000 $g/(m^{2*}day)$.

A composite sheet of substrate and polyamine polymer can be prepared by feeding a roll of substrate sheet to suitable nip rolls, where a mixture of polyamine polymer constituents in part or in entirety is contacted with the substrate and then pressed against the substrate by passing through nips. Or, or if an open pore substrate, the constituents may be pressed against and into the pores, if desired. In addition to amine-containing constituents, the mixture may also contain cross-linking agents, acidic species, and/or additional processing and performance aids including such constituents as plasticizers, fillers, and the like. The rate of application of this blend to the substrate will depend on how much coating or layer is desired. If appropriate, cross-linking can be initiated by and carried out by heating the laminate.

The blend can also be applied by casting, spraying, extrusion or the like. or by any means, well known in the art, of forming or coating with a substantially continuous sheet or film or layer.

Acidic species can then be incorporated, or further incorporated, as a part of the polyamine polymer. A means by which this may be carried out conveniently is by contacting the polyamine polymer with an acidic aqueous solution for a desired period of time. This may be facilitated, if appropriate. by saturating or filling a substrate or substrates with a solution which provides a conduit for the acidic species to react with the amines of the polyamine polymer.

The polyamine polymer and the substrate or substrates can be arranged in several configurations, examples of which are illustrated in FIGS. 3 through 18. In addition, it is often useful to create a laminate which incorporates additional layers of materials such as fabrics as part of the protective covering to further protect or augment the performance, or otherwise make the protective covering more suitable for use in its intended applications. An example of this is illustrated in FIG. 19.

Figure 3:
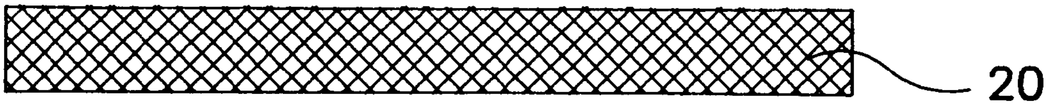
FIG. 3 depicts an embodiment of a sheet of the polyamine polymer.
Figure 4:
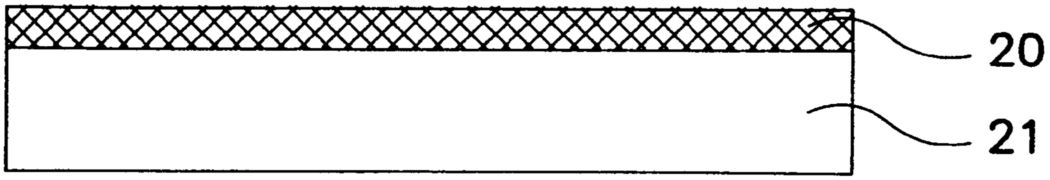
FIG. 4 depicts an embodiment of a composite sheet of the polyamine polymer on a void-free substrate.
Figure 5:
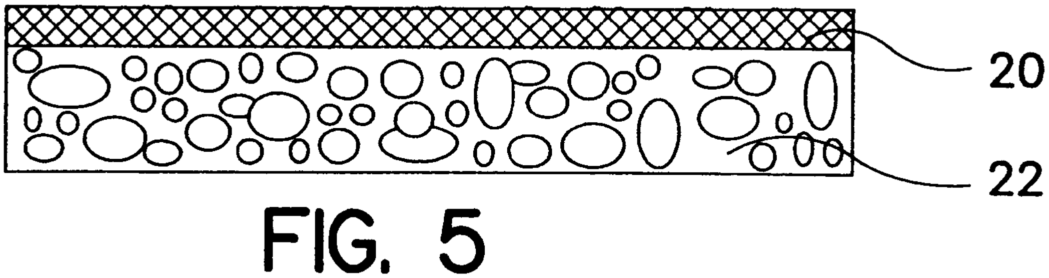
FIG. 5 depicts an embodiment of a composite sheet of the polyamine polymer on a closed pore substrate.
Figure 6:
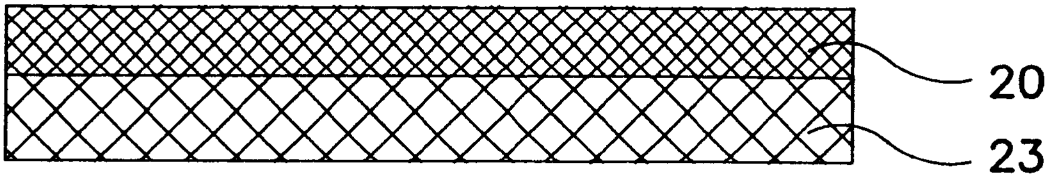
FIG. 6 depicts an embodiment of a composite sheet of the polyamine polymer on an open pore substrate.
Figure 7:
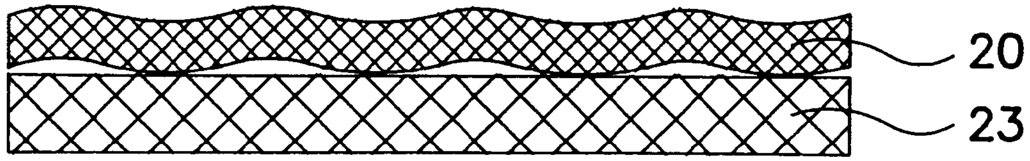
FIG. 7 depicts another embodiment of a composite sheet of the polyamine polymer on an open pore substrate.

As shown in FIG. 3, the polyamine polymer 20 may be formed into a free-standing film, or may be incorporated into a composite sheet with a water vapor permeable substrate as shown in FIGS. 4 through 14. FIG. 4, FIG. 5, and FIG. 6 depict composite sheets where the polyamine polymer 20 resides essentially on the surfaces of a void-free substrate 21, a closed pore substrate 22, and an open pore substrate 23, respectively. FIG. 7 depicts another embodiment where the polyamine polymer 20 resides essentially on the surface of an open-pore substrate 23.

Figure 8:
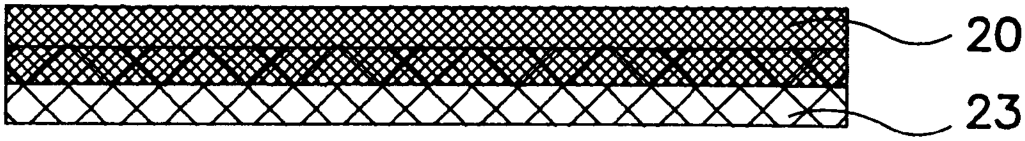
FIG. 8 depicts an embodiment of a composite sheet of the polyamine polymer and an open pore substrate wherein a portion of the polyamine polymer resides within the open pore substrate.
Figure 9:
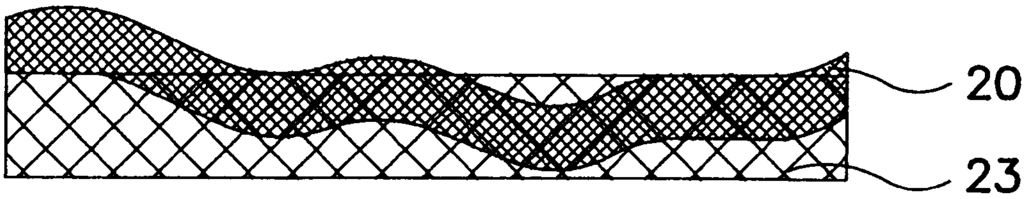
FIG. 9 depicts another embodiment of a composite sheet of the polyamine polymer and an open pore substrate wherein a portion of the polyamine polymer resides within the open pore substrate.
Figure 10:
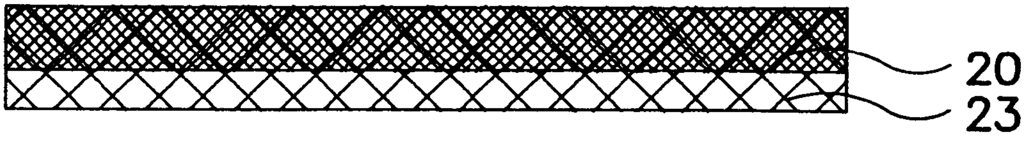
FIG. 10 depicts an embodiment of a composite sheet of the polyamine polymer and an open pore substrate wherein essentially all of the polyamine polymer resides within and partially fills the open pore substrate.
Figure 11:
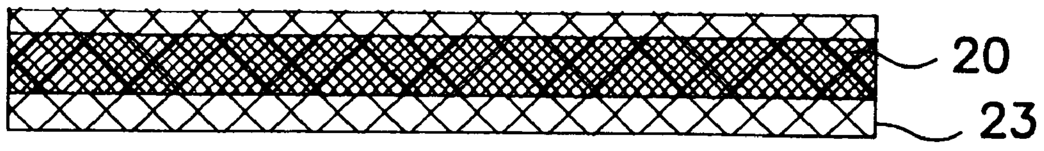
FIG. 11 depicts another embodiment of a composite sheet of the polyamine polymer and an open pore substrate wherein essentially all of the polyamine polymer resides within and partially fills the open pore substrate.
Figure 12:
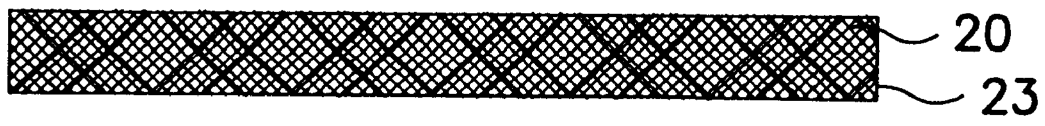
FIG. 12 depicts an embodiment of a composite sheet of the polyamine polymer and an open pore substrate wherein essentially all of the polyamine polymer resides within and substantially fills the voids of the open pore substrate.
Figure 13:
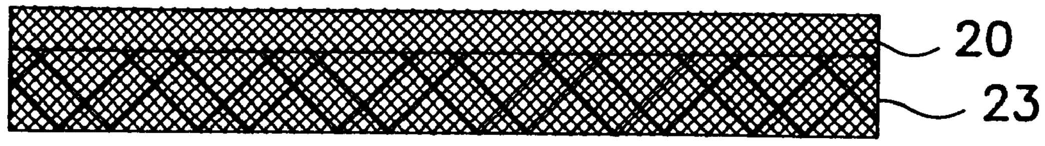
FIG. 13 depicts an embodiment of a composite sheet of the polyamine polymer and an open pore substrate wherein a portion of the polyamine polymer resides within and substantially fills the open pore substrate.
Figure 14:
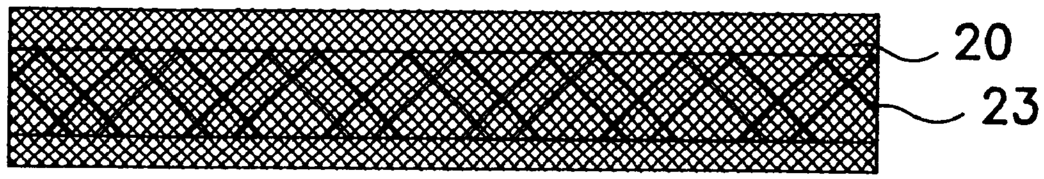
FIG. 14 depicts another embodiment of a composite sheet of the polyamine polymer and an open pore substrate wherein a portion of the polyamine polymer resides within and substantially fills the open pore substrate.

For open pore substrates, at least a portion of the polyamine polymer may be made to fill the voids of the substrate, partially or fully, as shown in FIGS. 8 through 19. FIG. 8 and FIG. 9 each depict a composite sheet where a portion of the polyamine polymer 20 partially fills an open pore substrate 23. FIG. 10 and FIG. 11 each depict a composite sheet where essentially all of the polyamine polymer 20 is contained within an open pore substrate 23, partially filling the open pore substrate. FIG. 12 depicts an open pore substrate 23 which is substantially filled with the polyamine polymer 20, essentially in its entirety. FIG. 13 and FIG. 14 each depict an embodiment of an open pore substrate 23 which is substantially filled by a portion of the polyamine polymer 20.

Figure 15:
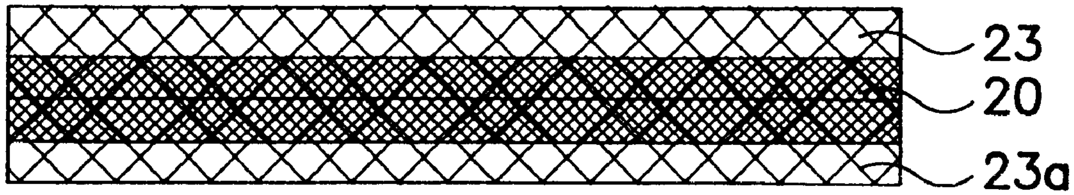
FIG. 15 depicts an embodiment of a composite sheet of the polyamine polymer between two open pore substrates wherein essentially all of the polyamine polymer resides within the substrates, a portion within each.
Figure 16:
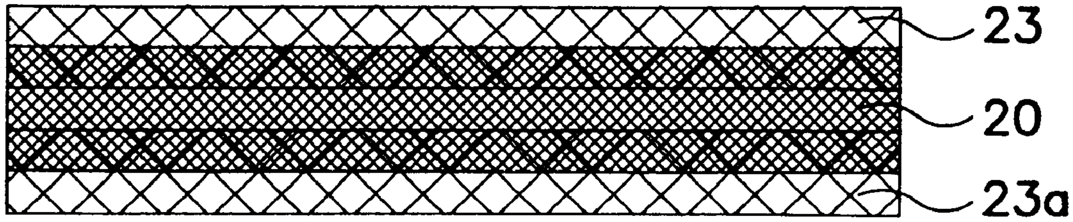
FIG. 16 depicts an embodiment of a composite sheet of the polyamine polymer between two open pore substrates wherein portions of the polyamine polymer reside within each of the substrates.
Figure 17:
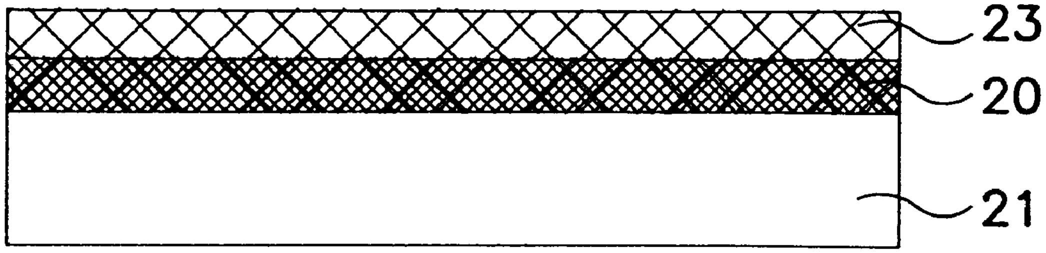
FIG. 17 depicts an embodiment of a composite sheet of the polyamine polymer between an open pore substrate and a void-free substrate wherein essentially all of the polyamine polymer resides with the open pore substrate.
Figure 18:
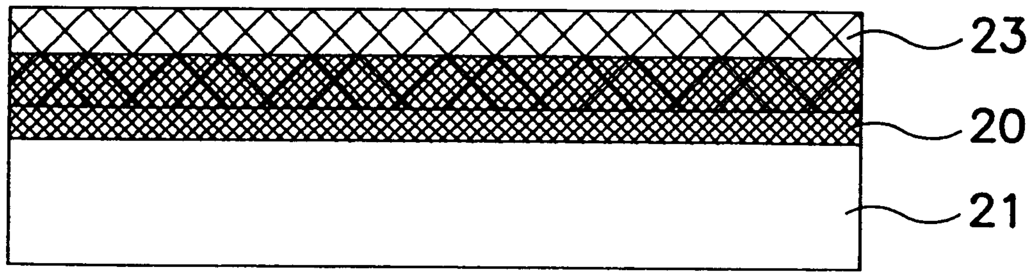
FIG. 18 depicts an embodiment of a composite sheet of the polyamine polymer between an open pore substrate and a void-free substrate wherein a portion of the polyamine polymer resides with the open pore substrate.
Figure 19:
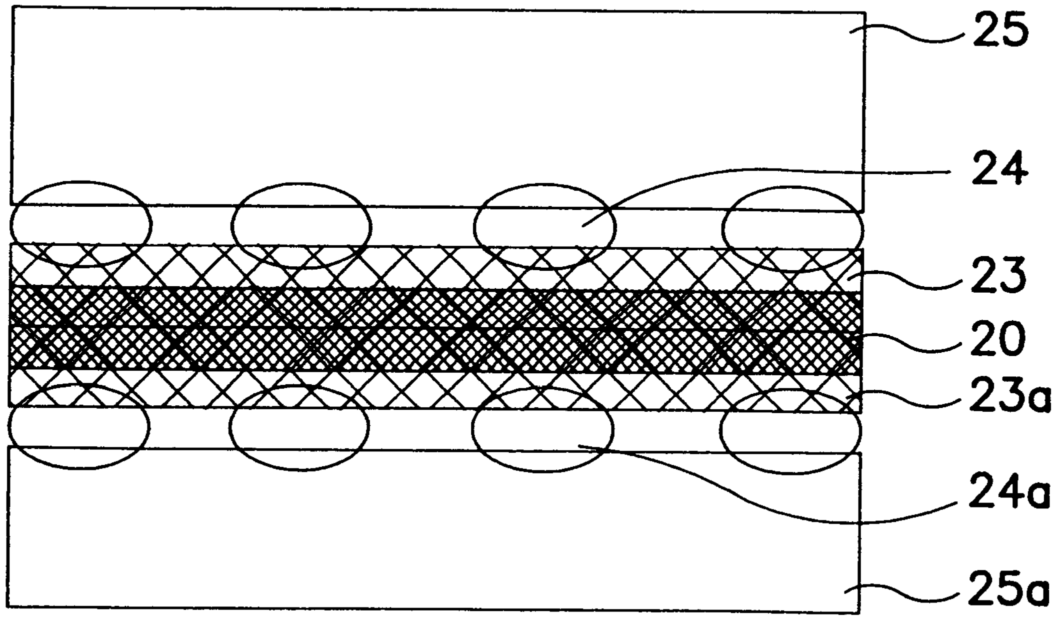
FIG. 19 depicts an embodiment of a multi-layered laminate incorporating textile layers.

If desired, a second substrate can be added, as shown in FIGS. 15 through 19. FIG. 15 and FIG. 16 each depict embodiments of composite sheets where the polyamine polymer 20 is contained between open pore substrates 23 and 23*a*. FIG. 15 depicts an embodiment where the open pore substrates 23 and 23*a* are essentially brought into contact with one another, resulting in the polyamine polymer 20 residing completely within the substrates, a portion in each. FIG. 16 depicts an embodiment where a portion of the polyamine polymer 20 resides in each of the open pore substrates 23 and 23*a*, with the substrates separated by a thickness of the polyamine polymer which does not reside within the substrates. FIG. 17 and FIG. 18 each depict an embodiment of a composite sheet where the polyamine polymer 20 is contained between an open pore substrate 23 and a void-free substrate 21, where at least a portion of the polyamine polymer resides within the open pore substrate. FIG. 17 depicts an embodiment where essentially all of the polyamine polymer 20 resides within the open pore substrate 23, and FIG. 18 depicts an embodiment where only a portion of the polyamine polymer 20 resides within the open pore substrate 23. It is clear that closed pore or open pore substrates could also be envisioned in place of the void-free substrates in each of the depictions.

Thus, it can be seen that the polyamine polymer may be made to coat or cover a water vapor permeable substrate, essentially residing on the surface. Or, in the case of open pore substrates, the polyamine polymer may additionally be made to imbibe into a substrate or substrates, through the substrate thickness, either to a very little extent or such that the polyamine polymer substantially fills the voids within a substrate through its entire thickness. The polyamine polymer may be made to reside completely within such open pore substrates, or only a portion of the polyamine polymer may be made to reside within.

It is understood that these depictions of polyamine polymer and water vapor permeable substrates are representative, but do not show all the possible embodiments of the invention. It is envisioned that multiple layers and combinations of layers of polyamine polymers, water vapor permeable substrates, and the composite sheets thereof, are possible.

As mentioned, it can often be desirable to incorporate additional layers of materials into a laminate which contains the polyamine polymer and composite sheets of the polyamine polymer and substrates. This may include, for example, such materials as various textiles, felts, polymeric films or membranes, scrims, leathers, and the like.

As used herein, a laminate is described as multiple layers of similar or dissimilar materials that are assembled together by any suitable means whereby the assembly is designed to perform as a whole that which the individual layers perform in part.

Suitable means for creation of a laminate include, but are not limited to, assembly of layers with discontinuous bonds such as discrete patterns of adhesive or point bonding, mechanical attachments such as sewn connections or other fixations, fusible webs and thermoplastic scrims, direct coating on, or within, partially or entirely, the various components of the laminate, or otherwise layering the various components in such manner as they are intended to function in conjunction with one another.

A laminate construction incorporating a polyamine polymer with water vapor permeable substrates in conjunction with additional layers of fabrics is depicted in FIG. 19. In this construction the polyamine polymer 20 is contained between open pore substrates 23 and 23*a*. This composite is laminated by discontinuously applied adhesive 24 and 24*a* to face fabric 25 and backing fabric 25*a* respectively. The adhesive is preferably a moisture-cured adhesive such as a moisture-cured polyurethane. The adhesive is shown as discontinuous dots, but could be in the form of a grid, lines, etc. The adhesive could also be applied continuously provided it is water vapor permeable. The face fabric is the outermost layer, generally exposed to the elements. It can be any textile, but is preferably a woven made of polyamide, polyester, aramid, acrylic, cotton, wool and the like. It can also be treated to render it hydrophobic and/or oleophobic. The backing material is an inner layer and can be, for example, a knit, woven or nonwoven. The fabrics may be additionally treated with such suitable materials as to impart fire retardant properties.

Of course, other laminate arrangements of substrates and polyamine polymer layers combined with one or more additional layers, such as fabrics or moisture vapor permeable polymeric layers, can be envisioned.

EXAMPLES

Polyamine Polymer with Substrates: Procedure A

Two counter-rotating 30" wide, 8" diameter rolls, horizontally opposed, were pressed together under 90 lbs/linear inch. One roll was chrome, the other roll was rubber coated. The chrome roll was heated to 60° C.

Open pore expanded PTFE membranes which were nominally 0.04 mm thick with a porosity of 75% to 80%, were continuously fed over each of the rolls and into the nip between the rolls, creating a valley into which was introduced a mixture of polymer components.

Constituents of the polyamine polymer layer, which will be specified, were mixed together using a small mixing blade attached to a hand drill. The mix was then immediately introduced into the nip. The materials were squeezed between and into the membranes and subsequently fed into an infra red heated oven, where they were heated at approximately 100° C. for 30 seconds to cure.

Polyamine Polymer with Substrates: Procedure B

This process is similar to "Polyamine Polymer with Substrates: Procedure A" but utilizes a dynamic pin mixer to ensure sufficient mixing of the polymer components. A mixture ratio, which will be specified, of Lupasol PR8515 polyethyleneimine from BASF Corporation, New York, and Araldite GY285 Bisphenol F epoxy from Ciba Specialty Chemicals Corporation, New York, is continuously introduced into a mix chamber where these components are blended by a motorized pin mixer. This blend is dispensed out of a flow spout and into the nip between two rolls, over each of which is being fed a continuous membrane of open pore expanded PTFE, as described in "Polyamine Polymer with Substrates: Procedure A". Each component of the two-part polymer system is preheated at 70° C. Both rolls utilized were 72" wide and 10" in diameter. The chrome roll was heated to 70° C. while the rubber coated roll was heated to 25° C. The nip pressure was set at 95 pounds per linear inch. The composite exiting the nip was fed into an IR oven with a film temperature of 130° C. and a dwell time of approximately 45 seconds to cure the polymer.

Incorporation of Amine-Acid Moieties: Procedure A

A sample 8"×12" of the composite sheet made by "Polyamine Polymer with Substrates: Procedure B" was cut. A one-liter aqueous acid solution was prepared and will be described. The sample was dipped in isopropyl alcohol (IPA) which wetted and filled the open pore PTFE surrounding the cross-linked polyethyleneimine polymer, providing a conduit for the acidic species of an aqueous acidic solution to reach the amines of the polyamine polymer. The sample was then immediately submerged in the aqueous acid solution and left for 20 minutes. The sample was then removed and air dried for at least 24 hours, and was then conditioned overnight in air at approximately 32° C., 100%RH.

Incorporation of Amine-Acid Moieties: Procedure B

A sample 8.5"×11" made by "Polyamine Polymer with Substrates: Procedure B" was cut and then dried under vacuum at 100–110° C. for one hour. The sample was then placed in a 9"×12" bag which was capable of being sealed shut. A total of 10 g of IPA was added to the bag, the bag was sealed, and the IPA within the bag was worked around by hand until both sides of the sample were soaked with the IPA. To this bag was then added a solution of 20 g water containing a specified amount of acid(s) which will be detailed below. The bag was sealed and the contents were constantly mixed by hand over a ten-minute period by shaking and rotating the bag with its contents. The sample was then removed, dried with paper towels, and then hung in a laboratory hood for 15 minutes. The sample was then dried under vacuum at 100–110° C. for one hour. The sample was subsequently conditioned overnight in air at approximately 32° C., 100%RH.

Incorporation of Amine-Acid Moieties: Procedure C

Samples were secured in an 8" diameter embroidery hoop. Into the concave side of the assembly a specified quantity of IPA was added and made to soak the entire area of the sample within the hoop by tilting the assembly back and forth. Immediately a specified quantity of a 2% weight basis aqueous solution of sulfuric acid was added. The assembly was tilted back and forth for a period of four minutes such that all areas of the sample within the hoop were treated with the solution. The excess was then poured from the hoop, the sample was removed, and then allowed to hang within a laboratory hood overnight to dry. The sample was subsequently conditioned overnight in air at approximately 32° C., 100%RH.

Water Vapor Transmission Rate Test

Water vapor transmission rates (WVTRs) were determined using the procedure set forth in U.S. Pat. No. 4,862,730 using potassium acetate as the salt and open pore expanded PTFE for the waterproof moisture vapor permeable membranes. These membranes nominally had a porosity of between 75% and 80%, with a thickness of approximately 0.04 mm. The environment was maintained at 50% relative humidity and 23° C. The water bath was maintained at 23° C.

Permeability to Bis-2-Chloroethyl Sulfide Test

Chemical permeation testing and analysis were adapted from (1) "Air-Permeable and Semi-permeable Materials Sorbent/Reactant Capacity Testing (Vapor Agent Challenge/Vapor Penetration)", protocols outlined in U.S. Army Test and Evaluation Command, Test Operating Procedure 8-2-501 (March 1997) and (2) Laboratory Methods for Evaluating Protective Clothing Systems Against Chemical Agents, CRDC-SP-84010 (June 1984). Testing was completed at Geomet Technologies, Inc., Gaithersburg, Md. A description of the test apparatus and experimental conditions follows.

This permeability was determined by using equipment consisting of a series of testing cells in which film or laminate samples are placed. Moreover the entire assembly is placed within an environmental chamber in which the temperature is controlled to 32° C. Each cell consists of an upper and lower section, commonly termed cell top and bottom. Both cell halves are equipped with inlet and outlet ports to afford the sweeping of gas streams through the cell and across the sample surface. The temperature of these gas streams is controlled to 32° C. The relative humidity of these gas streams is controlled to specific values which will be further detailed. Nominally 0.33 micrograms/$cm^3$ bis-2-chloroethyl sulfide (chemical structure $Cl—CH_2CH_2—S—CH_2CH_2—Cl$), referred to as "2CES", is introduced into the top air stream, and is swept across the tested sample through the top cell, which challenges the sample. The bottom cavity is swept with a clean air stream. 2CES vapor that has permeated through the sample is swept into the bottom air stream and captured downstream via solid sorbents and liquid impingement.

The area exposed to the 2CES challenge is 10 $cm^2$. The cell is equipped with sufficient rings, plates, clamps, and seals to securely mount the specimen and prevent leakage either out of the cell or between the cell halves. All cell assemblies are pressurized and leak tested prior to testing. The cell design is an augmented variation of that described in FIG. 2, 7, Laboratory Methods for Evaluating Protective Clothing Systems Against Chemical Agents, CRDC-SP-84010.

Upon completion of sample loading within the cells in the environmental chamber, all specimens are conditioned for two hours at 32° C. and 50% relative humidity. The 2CES challenge commences immediately following the two-hour initial conditioning period. Equilibrium is established under exposure to the 2CES challenge by running for two hours prior to collection of the 2CES permeate for analysis.

Subsequent to this equilibrium period, collection of the 2CES permeate for analysis is initiated, and continues for a three hour interval under the specified conditions of relative humidity and temperature. Agent detection media are removed at the end of the three hour period for analysis. The solid sorbent and liquid from the impinger are analyzed via colormetric/fluorometric techniques described in the reference materials above. Permeation data is reported in units of micrograms/cm$^2$ for each sample in each three-hour testing time span. From this is obtained a breakthrough rate, or flux of 2CES indicated in micrograms/cm$^2$/sec. Permeability is then determined by the ratio of this flux to the challenge concentration, and is reported in units of cm/sec. The resolution and lower limit of detection of this test was 2.79E-05 cm/sec.

Gurley Air Resistance Test

The resistance of air flow through these materials was evaluated by a Gurley densometer (ASTM D726-58) manufactured by W. & L. E. Gurley & Sons using the standard pressure cylinder, 100 cm$^3$ air, and an orifice size of one square inch. Results are reported in terms of the time in seconds required for the 100 cm$^3$ of air to pass through one square inch of the test material at a pressure drop of 4.88 inches of water across the sample.

Pliability: Handle-O-Meter

The ease of bending of a material, as well as the susceptibility to breakage were evaluated using a Handle-O-Meter, Model No. 211-5, manufactured by the Thwing-Albert Instrument Co., Pennsylvania. This device forces a sample to bend through a slot opening on a flat platform, and measures the required effort. For evaluation herein, a 1000 gram beam was used, and the samples were tested under conditions of 65% relative humidity and 23° C. The slot was set at a 0.25 inch gap. The samples used were 3 inches long and 1 inch wide, and were tested such that the length of the sample was oriented perpendicularly across the slot, with 1 inch on one side of the slot. The result, or hand, is reported as the peak effort required to bend and push the 1 inch wide sample through the slot. A sample is tested on each of its sides, in separate locations, and an average is determined, and represents the hand of the material. For materials which may have significant differences in physical properties depending upon their orientation (e.g., woven fabrics), an additional sample is taken at a 90 degree rotation from the first, evaluated, and the results are averaged in to obtain the hand of that material.

Example 1

A sample was created using "Polyamine Polymer with Substrates: Procedure A" with a weight basis mixture of 55% of the Lupasol PR 8515 polyethyleneimine and 45% of the Araldite GY285 epoxy. The coating laydown was approximately 18 g/m$^2$. A portion of this material was then treated by "Incorporation of Amine-Acid Moieties: Procedure A" using a 1% weight basis aqueous solution of sulfuric acid. The water vapor transmission rate and 2CES permeability were evaluated.

| | WVTR (g/(m$^2$* day)) | Permeability at 80% rh (cm/sec) |
|---|---|---|
| Without amine-acid moieties from $H_2SO_4$. | 6640 | 5.81E-04 |
| With amine-acid moieties from $H_2SO_4$. | 11941 | 8.71E-05 |

The sample incorporating amine-acid moieties derived from sulfuric acid demonstrated a factor of 1.80 increase in water vapor transmission and a factor of 6.67 decrease in the permeability of 2CES at 80% relative humidity versus the sample without the amine-acid moieties. This is an example where both improved protection, even at a high relative humidity, was achieved in conjunction with improved breathability. The permeability to 2CES at 50% relative humidity was at or below the lower limit of detection for both of the samples.

Example 2

A sample was created by "Polyamine Polymer with Substrates: Procedure B" with a weight basis mixture of 65% of the polyethyleneimine and 35% of the epoxy. The coating laydown was approximately 16 g/m$^2$. A portion of this material was then treated by "Incorporation of Amine-Acid Moieties: Procedure B" using 0.59 g of an 85% aqueous solution of phosphoric acid. The water vapor transmission rate and 2CES permeability were evaluated.

| | WVTR (g/(m$^2$* day)) | Permeability at 80% rh (cm/sec) |
|---|---|---|
| Without amine-acid moieties from $H_3PO_4$. | 14813 | 3.82E-03 |
| With amine-acid moieties from $H_3PO_4$. | 10443 | 5.61E-05 |

The sample incorporating amine-acid moieties derived from phosphoric acid retained approximately 70% of the water vapor transmission of the sample without the amine-acid moieties, while reducing the 2CES permeability to less than 1.5% of the sample without. This is an example demonstrating a very substantial improvement in protection, even at high relative humidity, while trading-off breathability to a much lessor degree. The permeability to 2CES at 50% relative humidity was at or below the lower limit of detection for both of the samples.

Example 3

A mixture of 56 g of pentaethylenehexamine was combined with 40 g of dimethylphthalate, each obtained from Aldrich Chemical Company, Inc., Wisconsin. The mixture was stirred for four hours at approximately 60° C. This composition was used in "Polyamine Polymer with Substrates: Procedure A" where 40 g of the composition were mixed with 28 g of Heloxy 68 neopentyl diglycidylether obtained from Shell Chemical Company, New Jersey. The coating laydown was approximately 39 g/m$^2$. A portion of this material was then modified by "Incorporation of Amine-Acid Moieties: Procedure C" using 6 g of IPA and 12 g of a 2% weight basis aqueous solution of sulfuric acid. The water vapor transmission rate and 2CES permeability were evaluated.

| | WVTR (g/(m$^{2*}$ day)) | Permeability at 80% rh (cm/sec) |
|---|---|---|
| Without amine-acid moieties from $H_2SO_4$. | 6531 | 4.16E-03 |
| With amine-acid moieties from $H_2SO_4$. | 14646 | 1.78E-03 |

The sample incorporating amine-acid moieties derived from sulfuric acid demonstrated a factor of 2.24 increase in water vapor transmission and a factor of 2.34 decrease in the permeability to 2CES at 80% relative humidity versus the sample without the amine-acid moieties. This is another example which demonstrates improved protection simultaneously with improved breathability. The permeability to 2CES at 50% relative humidity was at or below the lower limit of detection for both of the samples.

Example 4

A sample was created using "Polyamine Polymer with Substrates: Procedure A" with a weight basis mixture of 50% Astramol $(AM)_{16}$ polypropyleneimine obtained from DSM Fine Chemicals, the Netherlands, and 50% Araldite GY285 Bisphenol F epoxy. The coating laydown was approximately 23 g/m$^2$. A 1.1 oz/yd$^2$ polyester tricot knit and a 3.0 oz/yd$^2$ nylon plain weave fabric were then attached to opposing sides of the material using Rapidex™ Reactive Hot Melt adhesive HL-9588-X from H. B. Fuller in a discontinuous dot pattern. The knit side coverage of adhesive was approximately 44% by area, and the woven fabric side coverage of adhesive was approximately 30% by area. A portion of this laminate was then treated by "Incorporation of Amine-Acid Moieties: Procedure C" through the knit side of the laminate using 9 g of IPA and 16 g of a 2% weight basis aqueous solution of sulfuric acid. The water vapor transmission rate and 2CES permeability were evaluated.

| | WVTR (g/(m$^{2*}$ day)) | Permeability at 80% rh (cm/sec) |
|---|---|---|
| Without amine-acid moieties from $H_2SO_4$. | 1562 | 5.58E-05 |
| With amine-acid moieties from $H_2SO_4$. | 7182 | 8.37E-05 |

The sample incorporating amine-acid moieties derived from sulfuric acid demonstrated a factor of 4.60 increase in water vapor transmission. Both samples demonstrated a relatively low 2CES permeability at 80% relative humidity, the sample with the amine-acid moieties exhibiting only a factor of 1.50 increase in the permeability to 2CES versus the sample without the amine-acid moieties. The permeability to 2CES at 50% relative humidity was at or below the lower limit of detection for both of the samples.

Example 5

A sample was created using "Polyamine Polymer with Substrates: Procedure B" with a weight basis mixture of 55% polyethyleneimine and 45% epoxy. The coating laydown was approximately 18 g/m$^2$. A portion of this material was then modified by "Incorporation of Amine-Acid Moieties: Procedure B" using 0.17 g of sulfuric acid. A second portion of this material was modified by the same procedure using 0.26 g of sulfuric acid. The water vapor transmission rate and 2CES permeability were evaluated.

| | WVTR (g/(m$^{2*}$ day)) | Permeability at 80% rh (cm/sec) |
|---|---|---|
| Without amine-acid moieties from $H_2SO_4$. | 6,914 | 4.18E-04 |
| With amine-acid moieties from 0.17 g $H_2SO_4$. | 10,386 | 5.30E-04 |
| With amine-acid moieties from 0.26 g $H_2SO_4$. | 13,540 | 5.86E-04 |

These samples indicated an increasing water vapor transmission rate with increasing levels of sulfuric acid modification while demonstrating less of an increase in permeability to 2CES. The permeability to 2CES at 50% relative humidity was at or below the lower limit of detection for each of the samples.

Example 6

A sample of material from Example 5 without incorporation of amine-acid moieties was modified by "Incorporation of Amine-Acid Moieties: Procedure B" using 0.34 g of citric acid. The water vapor transmission rate and 2CES permeability were evaluated.

| | WVTR (g/(m$^{2*}$ day)) | Permeability at 80% rh (cm/sec) |
|---|---|---|
| Without amine-acid moieties from citric acid. | 6,914 | 4.18E-04 |
| With amine-acid moieties from citric acid. | 8,708 | 2.51E-04 |

The sample incorporating amine-acid moieties derived from citric acid demonstrated a factor of 1.26 increase in water vapor transmission rate and a factor of 1.67 decrease in 2CES permeability at 80% relative humidity versus the sample without the amine-acid moieties.

Example 7

20 g of Poly(vinylamine) Free Base from Air Products and Chemicals, Inc., Industrial Chemicals Division, Pennsylvania with an indicated molecular weight of 30,000 to 60,000 and 25% solids was mixed by hand with 8 g of a 25% weight basis aqueous solution of sulfuric acid, 1 g of a 25% aqueous solution of Aluminum Sulfate Hydrate (obtained from Aldrich), and 0.5 g Tris(2,3-epoxypropyl) isocyanurate (obtained from Aldrich). Once well blended, the mixture was cast onto a 3.2 ounce per square yard microdenier fiber nylon plain weave fabric obtained from Milliken using a 20 mil casting bar. The bar was drawn across the fabric substrate several times to obtain a smooth and uniform coating. This was then cured in a hot air convection oven at 150° C. for 15 minutes. The sample was then conditioned overnight at approximately 32° C. and 100% relative humidity. The coating was approximately 140 g/m$^2$. The water vapor transmission rate was measured to be 15,406 g/(m$^{2*}$day) and the permeability to 2CES was measured to be 8.37E-05 cm/sec at 80% relative humidity, demonstrating very good protection and breathability. The permeability to 2CES at 50% relative humidity was at or below the lower limit of detection.

Example 8

A sample was created using "Polyamine Polymer with Substrates: Procedure A" with a weight basis mixture of 55% Lupasol PR8515 polyethyleneimine and 45% Araldite GY285 Bisphenol F epoxy. The coating laydown was approximately 18 g/$m^2$. This material was then modified by "Incorporation of Amine-Acid Moieties: Procedure A" using a 0.75% weight basis aqueous solution of hydrochloric acid. The water vapor transmission rate was determined to be 27,109 g/($m^{2*}$day), demonstrating an extremely high breathability. The permeability to 2CES was determined to be 5.86E-03 cm/sec at 80% relative humidity. The permeability to 2CES at 50% relative humidity was at or below the lower limit of detection.

The hand of all samples of the examples was less than 250 and the samples were not subject to fracture or other apparent damage subsequent to evaluation of hand by the Handle-O-Meter. Additionally, all samples had Gurley values significantly greater than 5 seconds.

I claim:

1. A chemical protective covering comprising a selectively permeable sheet comprised of a polyamine polymer wherein at least 10% of the polyamine polymer amines are amine-acid moieties wherein the acidic species of said amine-acid moieties have a $pK_a$ less than 6.4; wherein the chemical protective covering has a water vapor transmission rate of at least 2,000 g/($m^{2*}$day) and a permeability to bis-2-chloroethyl sulfide of 0.02 cm/sec or less at 80% relative humidity.

2. The protective covering of claim 1 wherein the polyamine polymer sheet has a thickness of between 5 and 100 micrometers.

3. A chemical protective covering comprising a selectively permeable composite sheet comprised of at least one water vapor permeable substrate and a polyamine polymer wherein at least 10% of the polyamine polymer amines are amine-acid moieties wherein the acidic species of said amine-acid moieties have a $pK_a$ less than 6.4; wherein said polyamine polymer forms a substantially continuous layer residing essentially on the surface of said substrate.

4. The protective covering of claim 3 wherein the protective covering has a water vapor transmission rate of at least 2,000 g/($m^{2*}$day) and a permeability to bis-2-chloroethyl sulfide of 0.02 cm/sec or less at 80% relative humidity.

5. The protective covering of claim 4 wherein the substrate is an open pore substrate.

6. The protective covering of claim 4 wherein the substrate is a closed pore substrate.

7. The protective covering of claim 4 wherein the substrate is a substantially void-free substrate.

8. A chemical protective covering comprising a selectively permeable composite sheet comprised of at least one water vapor permeable open pore substrate and a polyamine polymer wherein at least 10% of the polyamine polymer amines are amine-acid moieties wherein the acidic species of said amine-acid moieties have a $pK_a$ less than 6.4; wherein said polyamine polymer forms a substantially continuous layer with at least a portion of the polyamine polymer residing within said open pore substrate.

9. The protective covering of claim 8 wherein the protective covering has a water vapor transmission rate of at least 2,000 g/($m^{2*}$day) and a permeability to bis-2-chloroethyl sulfide of 0.02 cm/sec or less at 80% relative humidity.

10. The protective covering of claim 9 wherein the open pore substrate is expanded PTFE.

11. The protective covering of claim 4 or 9 wherein the polyamine polymer component of the composite sheet has a thickness of between 5 and 100 micrometers.

12. The protective covering of claim 1 or 4 or 9 wherein the polyamine polymer has at least 6.5 amine milliequivalents/gram.

13. The protective covering of claim 1 or 4 or 9 wherein the protective covering is pliable, having a hand of 1000 or less with no significant damage subsequent to evaluation of hand.

14. The protective covering of claim 13 wherein the protective covering is a laminate comprised of at least one layer of a fabric.

15. An article of clothing comprising the laminate of claim 14.

16. An article of clothing comprising the protective covering of claim 13.

17. The protective covering of claim 1 or 4 or 9 wherein the polyamine polymer comprises a polyalkylamine.

18. The protective covering of claim 1 or 4 or 9 wherein the polyamine polymer comprises a polyalkyleneimine.

19. The protective covering of claim 1 or 4 or 9 wherein the permeability to bis-2-chloroethyl sulfide is 0.002 cm/sec or less at 80% relative humidity.

20. The protective covering-of claim 19 wherein the water vapor transmission rate is at least 4,000 g/($m^{2*}$day).

21. The protective covering of claim 20 wherein the permeability to bis-2-chloroethyl sulfide is 0.0002 cm/sec or less at 80% relative humidity.

22. The protective covering of claim 1 or 4 or 9 wherein at least 25% of the polyamine polymer amines are amine-acid moieties wherein the acidic species of said moieties have a $pK_a$ of 5.0 or less.

23. The protective covering of claim 1 or 4 or 9 wherein the polyamine polymer is crosslinked.

24. A pliable chemical protective covering comprising a selectively permeable composite sheet comprised of two water vapor permeable open pore expanded PTFE substrates and a polyamine polymer wherein at least 10% of the polyamine polymer amines are amine-acid moieties wherein the acidic species of said amine-acid moieties is $H_2SO_4$; wherein said polyamine polymer is comprised of a polyalkyleneimine and forms a substantially continuous layer residing between said substrates with at least a portion of the polyamine polymer residing within each substrate; wherein the chemical protective covering has a water vapor transmission rate of at least 2,000 g/($m^{2*}$day) and a permeability to bis-2-chloroethyl sulfide of 0.02 cm/sec or less at 80% relative humidity.

25. The protective covering of claim 24 wherein the protective covering has a water vapor transmission rate of at least 4,000 g/($M^{2*}$day) and a permeability to bis-2-chloroethyl sulfide of 0.002 cm/sec or less at 80% relative humidity.

26. The protective covering of claim 25 wherein the permeability to bis-2-chloroethyl sulfide is 0.0002 cm/sec or less at 80% relative humidity.

27. The protective covering of claim 24 wherein the polyalkyleneimine is polyethyleneimine.

28. The protective covering of claim 24 wherein the polyamine polymer is crosslinked.

29. The protective covering of claim 28 wherein the cross-linking comprises epoxide linkages.

30. The protective covering of claim 24 wherein at least 25% of the polyamine polymer amines are amine-acid moieties.

31. The protective covering of claim 30 wherein at least 40% of the polyamine polymer amines are amine-acid moieties.

32. The protective covering of claim 24 wherein the protective covering is a laminate comprised of at least one layer of a fabric.

33. The protective covering of claim 24 or 32 having a hand of 250 or less with no significant damage subsequent to evaluation of hand.

34. An article of clothing comprising the protective covering of claim 33.

35. A pliable chemical protective covering comprising a selectively permeable composite sheet comprised of at least one water vapor permeable open pore substrate and a polyamine polymer wherein at least 25% of the polyamine polymer amines are amine-acid moieties wherein the acidic species of said amine-acid moieties have a $pK_a$ of 5 or less; wherein said polyamine polymer forms a substantially continuous layer with at least a portion of the polyamine polymer residing within said open pore substrate;

wherein the chemical protective covering has a water vapor transmission rate of at least 2,000 g/($m^{2*}$day) and a permeability to bis-2-chloroethyl sulfide of 0.002 cm/sec or less at 80% relative humidity.

36. The protective covering of claim 35 wherein the polyamine polymer has at least 6.5 amine milliequivalents/gram and is comprised of a polyalkyleneimine.

37. The protective covering of claim 35 wherein the amine-acid moieties involve acidic species which are multiprotic.

38. The protective covering of claim 35 wherein the polyamine polymer is cross-linked.

39. The protective covering of claim 35 wherein the selectively permeable composite sheet comprises a second moisture vapor permeable substrate which is an open pore substrate, wherein the polyamine polymer is contained between the two substrates, a portion residing within each.

40. The protective covering of claim 39 wherein the selectively permeable composite sheet comprises a second moisture vapor permeable substrate which is an essentially void-free substrate, wherein the polyamine polymer is contained between the two substrates.

41. The protective covering of claim 39 wherein the second open pore substrate is open pore expanded PTFE.

42. The protective covering of claim 35 wherein the selectively permeable composite sheet comprises a second moisture vapor permeable substrate which is a closed pore substrate, wherein the polyamine polymer is contained between the two substrates.

43. The protective covering of claim 40 or 41 wherein the second substrate is comprised of a polyether polymer.

44. The protective covering of claim 35 wherein the open pore substrate is open pore expanded PTFE.

45. The protective covering of claim 35 wherein the protective covering is a laminate comprised of at least one layer of a fabric.

46. The protective covering of claim 35 or 45 having a hand of 1000 or less with no significant damage subsequent to evaluation of hand.

47. An article of clothing comprising the protective covering of claim 46.

* * * * *

UNITED STATES PATENT AND TRADEMARK OFFICE
CERTIFICATE OF CORRECTION

PATENT NO. : 6,395,383 B1
DATED : May 28, 2002
INVENTOR(S) : Maples

It is certified that error appears in the above-identified patent and that said Letters Patent is hereby corrected as shown below:

Column 22,
Line 4, change "39" to -- 35 --.

Signed and Sealed this

Twenty-ninth Day of October, 2002

Attest:

JAMES E. ROGAN

*Attesting Officer* *Director of the United States Patent and Trademark Office*